(12) United States Patent
Kedem et al.

(10) Patent No.: US 10,970,394 B2
(45) Date of Patent: Apr. 6, 2021

(54) SYSTEM, DEVICE, AND METHOD OF DETECTING VISHING ATTACKS

(71) Applicant: BioCatch Ltd., Tel Aviv (IL)

(72) Inventors: Oren Kedem, Tel Aviv (IL); Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 609 days.

(21) Appl. No.: 15/819,400

(22) Filed: Nov. 21, 2017

(65) Prior Publication Data
US 2019/0156034 A1    May 23, 2019

(51) Int. Cl.
G06Q 40/00    (2012.01)
G06F 21/56    (2013.01)
(Continued)

(52) U.S. Cl.
CPC ............ *G06F 21/566* (2013.01); *G06F 21/32* (2013.01); *G06F 21/552* (2013.01);
(Continued)

(58) Field of Classification Search
CPC ............ G06Q 40/00; G06Q 20/40145; G06Q 20/4016; G06F 21/566; G06F 21/32; G06F 21/552
See application file for complete search history.

(56) References Cited

U.S. PATENT DOCUMENTS 3,618,019 A    11/1971 Nemirovsky
3,699,517 A    10/1972 Dyche
(Continued)

FOREIGN PATENT DOCUMENTS

EP    2410450        1/2012
EP    2410450 A1    1/2012
(Continued)

OTHER PUBLICATIONS

"Andromaly": a behavioral malware detection framework for android devices, Shabtai, Asaf; Kanonov, Uri; Elovici, Yuval; Glezer, Chanan; Weiss, Yael. Journal of Intelligent Information Systems; New York vol. 38, Iss. 1, (Feb. 2012): 161-190. (Year: 2012).*
(Continued)

*Primary Examiner* — Lalita M Hamilton
(74) *Attorney, Agent, or Firm* — Eitan Mehulal Sadot (57) ABSTRACT

Devices, systems, and methods of detecting a vishing attack, in which an attacker provides to a victim step-by-step over-the-phone instructions that command the victim to log-in to his bank account and to perform a dictated banking transaction. The system monitors transactions, online operations, user interactions, gestures performed via input units, and user engagement with User Interface elements. The system detects that the operations performed by the victim, follow a pre-defined playbook of a vishing attack. The system detects that the victim operates under duress or under dictated instructions, as exhibited in irregular doodling activity, data entry rhythm, typographical error introduction rhythm, unique posture of the user, alternating pattern of listening to phone instructions and performing online operations via a computer, and device orientation changes or spatial changes that characterize a device being used to perform an online transaction while also talking on the phone.

12 Claims, 1 Drawing Sheet

(51) Int. Cl.
*G06F 21/32* (2013.01)
*G06Q 20/40* (2012.01)
*G06F 21/55* (2013.01)

(52) U.S. Cl.
CPC ....... *G06F 21/554* (2013.01); *G06Q 20/4016* (2013.01); *G06Q 20/40145* (2013.01)

(56) References Cited

U.S. PATENT DOCUMENTS

| | | |
|---|---|---|
| 3,983,535 A | 9/1976 | Herbst |
| 4,128,829 A | 12/1978 | Herbst |
| 4,621,334 A | 11/1986 | Garcia |
| 4,760,386 A | 7/1988 | Heath |
| 4,805,222 A | 2/1989 | Young |
| 5,305,238 A | 4/1994 | Starr |
| 5,442,342 A | 8/1995 | Kung |
| 5,485,171 A | 1/1996 | Copper |
| 5,557,686 A | 9/1996 | Brown |
| 5,565,657 A | 10/1996 | Merz |
| 5,581,261 A | 12/1996 | Hickman |
| 5,838,306 A | 11/1998 | O'Connor |
| 5,874,941 A | 2/1999 | Yamada |
| 5,999,162 A | 12/1999 | Takahashi |
| 6,202,023 B1 | 3/2001 | Hancock |
| 6,337,686 B2 | 1/2002 | Wong |
| 6,337,919 B1 | 1/2002 | Dunton |
| 6,442,692 B1 | 8/2002 | Zilberman |
| 6,572,014 B1 | 6/2003 | Lambert |
| 6,819,219 B1 | 11/2004 | Bolle |
| 6,836,554 B1 | 12/2004 | Bolle |
| 6,895,514 B1 | 5/2005 | Kermani |
| 6,931,131 B1 | 8/2005 | Becker |
| 6,938,061 B1 | 8/2005 | Rumynin |
| 6,938,159 B1 | 8/2005 | O'Connor |
| 6,957,185 B1 | 10/2005 | Labaton |
| 6,957,186 B1 | 10/2005 | Guheen |
| 6,983,061 B2 | 1/2006 | Ikegami |
| 7,092,926 B2 | 8/2006 | Cerrato |
| 7,130,452 B2 | 10/2006 | Bolle |
| 7,133,792 B2 | 11/2006 | Murakami |
| 7,139,916 B2 | 11/2006 | Billingsley |
| 7,158,118 B2 | 1/2007 | Liberty |
| 7,236,156 B2 | 6/2007 | Liberty |
| 7,245,218 B2 | 7/2007 | Ikehara |
| 7,366,919 B1 | 4/2008 | Sobel |
| 7,395,436 B1 | 7/2008 | Nemovicher |
| 7,494,061 B2 | 2/2009 | Reinhold |
| 7,523,191 B1 | 4/2009 | Thomas |
| 7,535,456 B2 | 5/2009 | Liberty |
| 7,606,915 B1 | 10/2009 | Calinov |
| 7,796,013 B2 | 9/2010 | Murakami |
| 7,818,290 B2 | 10/2010 | Davis |
| 7,860,870 B2 | 12/2010 | Sadagopan |
| 8,031,175 B2 | 10/2011 | Rigazio |
| 8,065,624 B2 | 11/2011 | Morin |
| 8,125,312 B2 | 2/2012 | Orr |
| 8,156,324 B1 | 4/2012 | Shnowske |
| 8,171,085 B1 * | 5/2012 | Tevanian, Jr. .......... H04L 51/12 709/206 |
| 8,201,222 B2 | 6/2012 | Inoue |
| 8,285,658 B1 | 10/2012 | Kellas-Dicks |
| 8,417,960 B2 | 4/2013 | Takahashi |
| 8,433,785 B2 | 4/2013 | Awadallah |
| 8,449,393 B2 | 5/2013 | Sobel |
| 8,499,245 B1 | 7/2013 | Froment |
| 8,510,113 B1 | 8/2013 | Conkie |
| 8,548,208 B2 | 10/2013 | Schultz |
| 8,549,629 B1 | 10/2013 | Mccreesh |
| 8,555,077 B2 | 10/2013 | Davis |
| 8,745,729 B2 | 6/2014 | Poluri |
| 8,788,838 B1 | 7/2014 | Fadell |
| 8,803,797 B2 | 8/2014 | Scott |
| 8,819,812 B1 | 8/2014 | Weber |
| 8,832,823 B2 | 9/2014 | Boss |
| 8,838,060 B2 | 9/2014 | Walley |
| 8,880,441 B1 | 11/2014 | Chen |
| 8,898,787 B2 | 11/2014 | Thompson |
| 8,904,479 B1 * | 12/2014 | Johansson ............... G06F 21/36 726/2 |
| 8,938,787 B2 | 1/2015 | Turgeman |
| 8,941,466 B2 | 1/2015 | Bayram |
| 8,990,959 B2 | 3/2015 | Zhu |
| 9,069,942 B2 | 6/2015 | Turgeman |
| 9,071,969 B2 | 6/2015 | Turgeman |
| 9,154,534 B1 | 10/2015 | Gayles |
| 9,174,123 B2 | 11/2015 | Nasiri |
| 9,195,351 B1 | 11/2015 | Rosenberg |
| 9,275,337 B2 | 3/2016 | Turgeman |
| 9,282,112 B2 | 3/2016 | Filatov |
| 9,301,140 B1 | 3/2016 | Costigan |
| 9,304,915 B2 | 4/2016 | Adams |
| 9,418,221 B2 | 8/2016 | Turgeman |
| 9,450,971 B2 | 9/2016 | Turgeman |
| 9,477,826 B2 | 10/2016 | Turgeman |
| 9,483,292 B2 | 11/2016 | Turgeman |
| 9,526,006 B2 | 12/2016 | Turgeman |
| 9,529,987 B2 | 12/2016 | Deutschmann |
| 9,531,701 B2 | 12/2016 | Turgeman |
| 9,531,733 B2 | 12/2016 | Turgeman |
| 9,536,071 B2 | 1/2017 | Turgeman |
| 9,541,995 B2 | 1/2017 | Turgeman |
| 9,547,766 B2 | 1/2017 | Turgeman |
| 9,552,470 B2 | 1/2017 | Turgeman |
| 9,558,339 B2 | 1/2017 | Turgeman |
| 9,589,120 B2 | 3/2017 | Samuel |
| 9,621,567 B2 | 4/2017 | Turgeman |
| 9,626,677 B2 | 4/2017 | Turgeman |
| 9,665,703 B2 | 5/2017 | Turgeman |
| 9,674,218 B2 | 6/2017 | Turgeman |
| 9,690,915 B2 | 6/2017 | Turgeman |
| 9,703,953 B2 | 7/2017 | Turgeman |
| 9,710,316 B1 | 7/2017 | Chheda |
| 9,712,558 B2 | 7/2017 | Turgeman |
| 9,747,436 B2 | 8/2017 | Turgeman |
| 9,779,423 B2 | 10/2017 | Turgeman |
| 9,832,192 B2 * | 11/2017 | Alonso Cebrian ..... H04L 63/08 |
| 9,838,373 B2 | 12/2017 | Turgeman |
| 9,848,009 B2 | 12/2017 | Turgeman |
| 9,927,883 B1 | 3/2018 | Lin |
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,262,324 B2 | 4/2019 | Turgeman |
| 10,298,614 B2 | 5/2019 | Turgeman |
| 10,395,018 B2 | 8/2019 | Turgeman |
| 10,397,262 B2 | 8/2019 | Karabchevsky |
| 2001/0004733 A1 | 6/2001 | Eldering |
| 2002/0023229 A1 | 2/2002 | Hangai |
| 2002/0089412 A1 | 7/2002 | Heger et al. |
| 2003/0033526 A1 | 2/2003 | French et al. |
| 2003/0074201 A1 | 4/2003 | Grashey et al. |
| 2003/0137494 A1 | 7/2003 | Tulbert |
| 2003/0212811 A1 | 11/2003 | Thornton |
| 2004/0015714 A1 | 1/2004 | Abraham et al. |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall et al. |
| 2004/0123156 A1 | 6/2004 | Hammond |
| 2004/0143737 A1 | 7/2004 | Teicher |
| 2004/0186882 A1 | 9/2004 | Ting |
| 2004/0221171 A1 | 11/2004 | Ahmed |
| 2005/0008148 A1 | 1/2005 | Jacobson |
| 2005/0060138 A1 | 3/2005 | Wang et al. |
| 2005/0179657 A1 | 8/2005 | Russo et al. |
| 2005/0289264 A1 | 12/2005 | Illowsky et al. |

(56) References Cited

U.S. PATENT DOCUMENTS

| | | |
|---|---|---|
| 2006/0006803 A1 | 1/2006 | Huang et al. |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham et al. |
| 2006/0215886 A1 | 9/2006 | Black |
| 2006/0224898 A1 | 10/2006 | Ahmed |
| 2006/0239430 A1* | 10/2006 | Gue .............. G06Q 30/06 379/201.05 |
| 2006/0282660 A1 | 12/2006 | Varghese et al. |
| 2006/0284969 A1 | 12/2006 | Kim et al. |
| 2007/0118804 A1 | 5/2007 | Raciborski et al. |
| 2007/0156443 A1 | 7/2007 | Gurvey |
| 2007/0174082 A1 | 7/2007 | Singh |
| 2007/0183633 A1 | 8/2007 | Hoffmann |
| 2007/0214426 A1 | 9/2007 | Ruelle et al. |
| 2007/0226797 A1 | 9/2007 | Thompson |
| 2007/0236330 A1 | 10/2007 | Cho |
| 2007/0240230 A1 | 10/2007 | O'Connell |
| 2007/0250920 A1 | 10/2007 | Lindsay |
| 2007/0255821 A1 | 11/2007 | Ge et al. |
| 2007/0266305 A1 | 11/2007 | Cong et al. |
| 2007/0271466 A1 | 11/2007 | Mak et al. |
| 2007/0283416 A1 | 12/2007 | Renaud |
| 2008/0046982 A1 | 2/2008 | Parkinson |
| 2008/0059474 A1 | 3/2008 | Lim |
| 2008/0068343 A1 | 3/2008 | Hoshino |
| 2008/0084972 A1 | 4/2008 | Burke |
| 2008/0091639 A1 | 4/2008 | Davis et al. |
| 2008/0092209 A1 | 4/2008 | Davis et al. |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Hio |
| 2008/0162449 A1 | 7/2008 | Chao-Yu et al. |
| 2008/0183745 A1 | 7/2008 | Cancel et al. |
| 2008/0192005 A1 | 8/2008 | Elgoyhen |
| 2008/0200310 A1 | 8/2008 | Tagliabue |
| 2008/0211766 A1 | 9/2008 | Westerman et al. |
| 2008/0215576 A1 | 9/2008 | Zhao et al. |
| 2008/0263636 A1 | 10/2008 | Gusler |
| 2008/0298588 A1 | 12/2008 | Shakkarwar |
| 2008/0301808 A1 | 12/2008 | Calo et al. |
| 2008/0306897 A1 | 12/2008 | Liu |
| 2009/0037983 A1 | 2/2009 | Chiruvolu |
| 2009/0038010 A1 | 2/2009 | Ma |
| 2009/0089879 A1 | 4/2009 | Wang et al. |
| 2009/0094311 A1 | 4/2009 | Awadallah et al. |
| 2009/0132395 A1 | 5/2009 | Lam |
| 2009/0157792 A1 | 6/2009 | Fiatal |
| 2009/0172551 A1 | 7/2009 | Kane |
| 2009/0189736 A1 | 7/2009 | Hayashi |
| 2009/0199296 A1 | 8/2009 | Xie et al. |
| 2009/0227232 A1 | 9/2009 | Matas |
| 2009/0241188 A1 | 9/2009 | Komura |
| 2009/0254336 A1 | 10/2009 | Dumais et al. |
| 2009/0281979 A1 | 11/2009 | Tysowski |
| 2009/0293119 A1 | 11/2009 | Jonsson |
| 2009/0320123 A1 | 12/2009 | Yu et al. |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar et al. |
| 2010/0046806 A1 | 2/2010 | Baughman et al. |
| 2010/0070405 A1 | 3/2010 | Joa |
| 2010/0077470 A1 | 3/2010 | Kozat et al. |
| 2010/0082747 A1 | 4/2010 | Yue et al. |
| 2010/0082998 A1 | 4/2010 | Kohavi |
| 2010/0115610 A1 | 5/2010 | Tredoux |
| 2010/0122082 A1 | 5/2010 | Deng et al. |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0269165 A1 | 10/2010 | Chen |
| 2010/0281539 A1 | 11/2010 | Burns et al. |
| 2010/0284532 A1 | 11/2010 | Burnett |
| 2010/0287229 A1 | 11/2010 | Hauser |
| 2010/0321304 A1 | 12/2010 | Rofougaran |
| 2010/0328074 A1 | 12/2010 | Johnson et al. |
| 2011/0010209 A1 | 1/2011 | McNally |
| 2011/0012829 A1 | 1/2011 | Yao |
| 2011/0016320 A1 | 1/2011 | Bergsten et al. |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1 | 3/2011 | Zhang |
| 2011/0063211 A1 | 3/2011 | Hoerl et al. |
| 2011/0065504 A1 | 3/2011 | Dugan et al. |
| 2011/0082768 A1* | 4/2011 | Eisen .............. H04L 63/1483 705/26.35 |
| 2011/0102570 A1 | 5/2011 | Wilf et al. |
| 2011/0105859 A1 | 5/2011 | Popovic |
| 2011/0113388 A1 | 5/2011 | Eisen et al. |
| 2011/0154273 A1 | 6/2011 | Aburada et al. |
| 2011/0159650 A1 | 6/2011 | Shiraishi |
| 2011/0159850 A1 | 6/2011 | Faith |
| 2011/0162076 A1 | 6/2011 | Song et al. |
| 2011/0191820 A1 | 8/2011 | Ivey |
| 2011/0193737 A1 | 8/2011 | Chiueh |
| 2011/0202453 A1 | 8/2011 | Issa et al. |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai et al. |
| 2011/0248941 A1 | 10/2011 | Abdo |
| 2011/0251823 A1 | 10/2011 | Davis et al. |
| 2011/0271342 A1 | 11/2011 | Chung et al. |
| 2011/0276414 A1 | 11/2011 | Subbarao et al. |
| 2011/0304531 A1 | 12/2011 | Brooks |
| 2011/0320822 A1 | 12/2011 | Lind et al. |
| 2012/0005483 A1 | 1/2012 | Patvarczki et al. |
| 2012/0005719 A1 | 1/2012 | McDougal |
| 2012/0007821 A1 | 1/2012 | Zaliva |
| 2012/0054834 A1 | 3/2012 | King |
| 2012/0096555 A1 | 4/2012 | Mahaffey |
| 2012/0102551 A1 | 4/2012 | Bidare |
| 2012/0113061 A1 | 5/2012 | Ikeda |
| 2012/0124662 A1 | 5/2012 | Baca |
| 2012/0133055 A1 | 5/2012 | Machida |
| 2012/0151559 A1 | 6/2012 | Koudys et al. |
| 2012/0154173 A1 | 6/2012 | Chang et al. |
| 2012/0154273 A1 | 6/2012 | Mcdade et al. |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1 | 6/2012 | Shi |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber et al. |
| 2012/0246737 A1 | 9/2012 | Paxton |
| 2012/0252410 A1 | 10/2012 | Williams |
| 2012/0278804 A1 | 11/2012 | Narayanasamy et al. |
| 2012/0284380 A1 | 11/2012 | Anderson |
| 2013/0024239 A1 | 1/2013 | Baker |
| 2013/0036416 A1 | 2/2013 | Raju et al. |
| 2013/0076650 A1 | 3/2013 | Vik |
| 2013/0088434 A1 | 4/2013 | Masuda |
| 2013/0097682 A1 | 4/2013 | Zeljkovic et al. |
| 2013/0097706 A1 | 4/2013 | Titonis et al. |
| 2013/0111586 A1 | 5/2013 | Jackson |
| 2013/0132091 A1* | 5/2013 | Skerpac .............. G10L 17/14 704/273 |
| 2013/0133055 A1 | 5/2013 | Ali et al. |

(56) References Cited

U.S. PATENT DOCUMENTS

| | | |
|---|---|---|
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar et al. |
| 2013/0212674 A1 | 8/2013 | Boger |
| 2013/0239195 A1 | 9/2013 | Turgeman |
| 2013/0239206 A1 | 9/2013 | Draluk |
| 2013/0282637 A1 | 10/2013 | Costigan |
| 2013/0288647 A1 | 10/2013 | Turgeman |
| 2013/0305357 A1 | 11/2013 | Ayyagari et al. |
| 2013/0312097 A1 | 11/2013 | Turnbull |
| 2013/0335349 A1 | 12/2013 | Ferren |
| 2014/0033317 A1 | 1/2014 | Barber |
| 2014/0041020 A1 | 2/2014 | Zhao |
| 2014/0078061 A1 | 3/2014 | Simons et al. |
| 2014/0078193 A1 | 3/2014 | Barnhoefer et al. |
| 2014/0082369 A1 | 3/2014 | Waclawsky et al. |
| 2014/0111451 A1 | 4/2014 | Park |
| 2014/0118520 A1 | 5/2014 | Slaby |
| 2014/0143304 A1 | 5/2014 | Hegarty et al. |
| 2014/0168093 A1 | 6/2014 | Lawrence |
| 2014/0196119 A1 | 7/2014 | Hill et al. |
| 2014/0200953 A1 | 7/2014 | Mun |
| 2014/0250538 A1 | 9/2014 | Rapaport et al. |
| 2014/0259130 A1 | 9/2014 | Li et al. |
| 2014/0270571 A1 | 9/2014 | Dwan et al. |
| 2014/0283059 A1 | 9/2014 | Sambamurthy et al. |
| 2014/0317028 A1 | 10/2014 | Turgeman |
| 2014/0317726 A1 | 10/2014 | Turgeman |
| 2014/0317734 A1 | 10/2014 | Valencia et al. |
| 2014/0317744 A1 | 10/2014 | Turgeman |
| 2014/0325223 A1 | 10/2014 | Turgeman |
| 2014/0325645 A1 | 10/2014 | Turgeman |
| 2014/0325646 A1 | 10/2014 | Turgeman |
| 2014/0325682 A1 | 10/2014 | Turgeman |
| 2014/0337786 A1 | 11/2014 | Luo |
| 2014/0344927 A1 | 11/2014 | Turgeman et al. |
| 2015/0002479 A1 | 1/2015 | Kawamura |
| 2015/0012920 A1 | 1/2015 | De Santis et al. |
| 2015/0062078 A1 | 3/2015 | Christman |
| 2015/0091858 A1 | 4/2015 | Rosenberg |
| 2015/0094030 A1 | 4/2015 | Turgeman |
| 2015/0101031 A1 | 4/2015 | Harjanto et al. |
| 2015/0146945 A1 | 5/2015 | Han |
| 2015/0205944 A1 | 7/2015 | Turgeman |
| 2015/0205955 A1 | 7/2015 | Turgeman |
| 2015/0205957 A1 | 7/2015 | Turgeman |
| 2015/0205958 A1 | 7/2015 | Turgeman |
| 2015/0212843 A1 | 7/2015 | Turgeman |
| 2015/0213244 A1 | 7/2015 | Lymberopoulos |
| 2015/0213246 A1 | 7/2015 | Turgeman |
| 2015/0213251 A1 | 7/2015 | Turgeman |
| 2015/0256528 A1 | 9/2015 | Turgeman |
| 2015/0256556 A1 | 9/2015 | Kaminsky |
| 2015/0264572 A1 | 9/2015 | Turgeman |
| 2015/0268768 A1 | 9/2015 | Woodhull |
| 2015/0310196 A1* | 10/2015 | Turgeman ............ G06F 3/04842 726/19 |
| 2016/0006800 A1 | 1/2016 | Summers et al. |
| 2016/0019546 A1* | 1/2016 | Eisen ................. G06F 21/44 705/44 |
| 2016/0034673 A1 | 2/2016 | Chandra |
| 2016/0042164 A1 | 2/2016 | Goldsmith et al. |
| 2016/0077620 A1 | 3/2016 | Choi |
| 2016/0109969 A1 | 4/2016 | Keating |
| 2016/0132105 A1 | 5/2016 | Turgeman |
| 2016/0164905 A1 | 6/2016 | Pinney Wood et al. |
| 2016/0164906 A1 | 6/2016 | Pinney Wood et al. |
| 2016/0174044 A1 | 6/2016 | Jones |
| 2016/0179245 A1 | 6/2016 | Johansson |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulbert |
| 2016/0226865 A1 | 8/2016 | Chen |
| 2016/0294837 A1 | 10/2016 | Turgeman |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura et al. |
| 2017/0054702 A1 | 2/2017 | Turgeman |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |
| 2017/0140279 A1 | 5/2017 | Turgeman |
| 2017/0149958 A1 | 5/2017 | Xian |
| 2017/0154366 A1 | 6/2017 | Turgeman |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364919 A1 | 12/2017 | Ranganath |
| 2018/0012227 A1 | 1/2018 | Tunnell |
| 2018/0034850 A1 | 2/2018 | Turgeman |
| 2018/0046792 A1* | 2/2018 | Toqan ................ G06K 9/00885 |
| 2018/0095596 A1 | 4/2018 | Turgeman |
| 2018/0097841 A1* | 4/2018 | Stolarz ................ H04L 63/10 |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |
| 2018/0160309 A1 | 6/2018 | Turgeman |
| 2018/0314816 A1 | 11/2018 | Turgeman |
| 2018/0349583 A1 | 12/2018 | Turgeman |
| 2018/0350144 A1 | 12/2018 | Rathod |
| 2018/0351959 A1 | 12/2018 | Turgeman |
| 2019/0028497 A1 | 1/2019 | Karabchevsky |
| 2019/0057200 A1 | 2/2019 | Sabag |
| 2019/0121956 A1 | 4/2019 | Turgeman |
| 2019/0124068 A1* | 4/2019 | Anders ................ H04L 63/083 |
| 2019/0156034 A1 | 5/2019 | Kedem |
| 2019/0158535 A1 | 5/2019 | Kedem |
| 2019/0220863 A1 | 7/2019 | Novick |

FOREIGN PATENT DOCUMENTS

| | | |
|---|---|---|
| EP | 2477136 | 7/2012 |
| EP | 2477136 A1 | 7/2012 |
| EP | 2610776 | 7/2013 |
| EP | 2610776 A2 | 7/2013 |
| EP | 2646904 B1 | 8/2018 |
| EP | 3019991 B1 | 2/2019 |
| ES | 2338092 A1 | 5/2010 |
| ES | 2338092 | 5/2020 |
| WO | 2005099166 | 10/2005 |
| WO | 2005099166 A2 | 10/2005 |
| WO | 2007146437 | 12/2007 |
| WO | 2007146437 A2 | 12/2007 |
| WO | 2012073233 | 6/2012 |
| WO | 2012073233 A1 | 6/2012 |

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.

(56) References Cited

OTHER PUBLICATIONS

Bailey, Kyle O., "Computer Based Behavioral Biometric Authentication via Multi-Modal Fusion", Thesis, 2013, Air Force Insitute of Technology.
Stinson et al., "Characterizing Bots' Remote Control Behavior". Detection of Intrusions and Malware, and Vulnerability Assessment. Springer Berlin Heidelberg, p. 89-108. Dec. 31, 2007.
Todorov, "Optimality Principles in Sensorimotor Control (Review)", Sep. 2004, Nature Neuroscience 7, pp. 907-915.
Cleeff et al., "Security Implications of Virtualization: A Literature Study", Science and Engineering, 2009.
Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.
Ferrie Peter, "Attack on Virtual Machine Emulators", Symantec Technology Exchange, 2007.
Yampolskiy et al., "Behavioural Biometrics: a survey and classification", 2008, International Journal of Biometrics, vol. 1, No. 1, pp. 81-113.
Provos et al., 2007, "The Ghost in the Browser: Analysis of Web-based Malware".
Huang Yao-Wen et al., "Web application security assessment by fault injection and behavior monitoring", 2003, Proceedings of the 12th international conference on World Wide Web, ACM.
Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.
Franklin et al., "Remote Detection of Virtual Machine Monitors with Fuzzy benchmarking", ACM SIGOPS Operating Systems Review, V42, Issue 3, Apr. 2008.
Georgia Frantzeskou et al., "Identifying Authorship by Byte-Level N-Grams: The source Code Author Profile (SCAP) Method", Spring 2007, International Journal of Digital Evidence, vol. 6, issue 1.
Liston et al., "On the Cutting Edge: Thwarting Virtual Machine Detection"; retrieved from the Internet on May 3, 2017, from: http://docplayernet/9791309-On-the-cutting-edge-thwarting-virtual-machine-detection.html.
Zheng et al., "An Efficient User Verification System via Mouse Movements", Oct. 17-21, 2011, CCS'11, Chicago, Illinois.
Tavis Ormandy, "An Empirical Study into the Security Exposure to Hosts of Hostile Virtualized Environments", retrieved from the Internet on May 3, 2017, from: http://taviso.decsystem.org/virtsec.pdf.
Spafford et al., "Software Forensics: Can We Track Code to its Authors?", Feb. 1992, Computer Science Technical Report, Purdue e-Pubs, Report No. CSD-TR-92-010.
Garfinkel and Rosenblum, "A virtual Machine Introspection-Based Architecture for Intrusion Detection.", 2003, Proc. Network and Distributed Systems Security Symp., The Internet Society, pp. 191-206.
Nance et al., "Virtual Machine Introspection", IEEE Security & Privacy, 2008.
Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.
International Search Report for application PCT/IL2011/000907 dated Apr. 19, 2012.
International Search Report for application PCT/IB2014/062293 dated Oct. 1, 2014.
International Search Report for application PCT/IB2014/062941 dated Dec. 17, 2014.
International Search Report for application PCT/IB2016/054064 dated Nov. 21, 2016.
Supplementary European Search Report for application 11844440 dated Nov. 17, 2017.
Faisal Alkhateeb et al., "Bank Web Sites Phishing Detection and Notification System Based on Semantic Web technologies", International Journal of Security and its Applications 6(4):53-66, Oct. 2012.
Sungzoon Cho et al., "Artificial Rhythms and Cues for Keystroke Dynamics Based Authentication", International Conference on Biometrics (ICB)—Advances in Biometrics, pp. 626-632, year 2006.
International Search Report for PCT/IB2017/055995, dated Feb. 15, 2018.
Written Opinion of the International Search Authority for PCT/IB2017/055995, dated Feb. 15, 2018.
Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.
Ben Hansen, "The Blur Busters Mouse Guide", dated Feb. 1, 2014; printed from the Internet on Aug. 5, 2019 from: https://www.blurbusters.com/faq/mouse-guide/.
Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.
International Search Report for PCT international application PCT/IL2018/051246, dated Mar. 11, 2019.
Written Opinion of the International Searching Authority for PCT international application PCT/IL2018/051246, dated Mar. 11, 2019.
Written Opinion of the International Searching Authority for PCT international application PCT/IL2011/000907, dated Apr. 19, 2012.
written Opinion of the International Searching Authority for PCT international application PCT/IB2014/062293, dated Oct. 1, 2014.
Written Opinion of the International Searching Authority for PCT international application PCT/IB2014/062941, dated Dec. 17, 2014.
Written Opinion of the International Searching Authority for PCT international application PCT/IB2016/054064, dated Jul. 9, 2015.
Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.
Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.

* cited by examiner

SYSTEM, DEVICE, AND METHOD OF DETECTING VISHING ATTACKS

FIELD

The present invention is related to electronic devices and computerized systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking website.

SUMMARY

The present invention may include, for example, systems, devices, and methods for detecting a "vishing" attack (or other type of social engineering attack, or fraud), and/or for stopping or preventing or combatting such attack. Some embodiments enable a computerized system to defend itself against such attack(s), and to have new capabilities that enable the computerized system to autonomously stop such attack(s) and/or to autonomously take mitigation operations or reparation operations for such attacks.

Some embodiments may enable a computerized system to differentiate or distinguish between: (i) a legitimate user (e.g., the real or true owner of an online account) that voluntarily and freely operates under his own free will and without duress, and (ii) the legitimate user that operates under duress and/or that performs computerized operations under the dictated instructions or the dictated guidelines that are conveyed to him by a third party (e.g., a remote third party such as a fraudulent person that poses to be a customer service representative).

Some embodiments may further distinguish among: between: (i) a legitimate user (e.g., the real or true owner of an online account) that voluntarily and freely operates under his own free will and without duress, and (ii) the legitimate user that operates under duress and/or that performs computerized operations under the dictated instructions or the dictated guidelines that are conveyed to him by a third party (e.g., a remote third party such as a fraudulent person ("fraudster") that poses to be a customer service representative), and (iii) an illegitimate user that logs-in or accesses an online account and is not the legitimate user (e.g., is not the true owner or the real owner of that account).

Some embodiments may operate to detect or to confirm identity of a user of an electronic device, and/or for determining whether or not an electronic device is being used by a fraudulent user or by a legitimate user, and/or for differentiating or distinguishing between (or among) users of a computerized service or between (or among) users of an electronic device.

The present invention may provide other and/or additional benefits or advantages.

DETAILED DESCRIPTION OF THE PRESENT INVENTION

The Applicants have realized that in addition to a "phishing" attack, in which a fraudulent email attempts to lure a user to log-in into a fake website that poses as a legitimate website (and thus operates to steal user credentials), other types of attacks and social engineering schemes may be utilized against users of electronic devices, such as a "vishing" attack as described herein.

The Applicants have realized that some criminals or fraudulent users or "fraudsters" perpetrate fraud by performing social engineering upon victims, particularly via a "vishing" attack in which the victim is persuaded or lured to submit or to perform online financial transactions under false pretenses, particularly based on telephonic guidelines or telephonic instructions that are provided to the victim by the fraudster who poses to be a customer service representative that attempts to help the victim over the telephone.

In a first example, a criminal Carl calls by phone the victim Victor; the criminal Carl poses over the telephone to be a representative of a bank in which the victim Victor has an account. The criminal Carl explains to the victim Victor that the bank account of victim Victor was compromised, and that the bank is now opening a new non-compromised account for victim Victor, and that the representative Carl will now guide the victim Victor how to log-in to his current bank account in order to transfer his funds from it to the newly-opened bank account. Then, the criminal Carl guides the victim Victor to access the real and legitimate website of the bank; to log-in to the victim's real and legitimate bank account, using his real credentials; and then, the criminal Carl guides the victim Victor to do a wire transfer to a destination account, that is said to be the newly-opened non-compromised bank account of the victim Victor, but is in fact a third-party bank account that is controlled by criminal Carl. The victim Victor proceeds to perform these online operations, based on telephonic instructions that are dictated to him over the phone.

The Applicants have realized that this type of attacks, sometimes referred to as a "vishing" attack, may be very difficult to detect and/or to prevent; since, for example, the online transaction is performed by the legitimate user (the real owner of the bank account), who enters his real and regular credentials (username and password), who utilizes his regular computer and his regular web browser from his regular Internet Protocol (IP) address (such as from his home); and may even perform two-factor authentication (e.g., by clicking on an authentication link that is provided to him by email, or be entering a code that is sent to him via SMS message). Similarly, other security measures that aim to validate the identity of the user, such as security questions that are presented to the user, are ineffective to stop vishing attacks since it is indeed the legitimate user that logs-in and performs the online operations that (unknown to him) carry out the fraudulent transaction that benefits the fraudster based on the guidelines from the fraudster.

The terms "vishing" or "vishing attack" as used herein may comprise, for example, an attack (or a social engineering process which is part of an attack) against a victim, in which the attacker contacts the victim via telephone (e.g., landline, cellular phone, mobile phone, Voice over IP telephony, or the like), the attacker poses to be a representative of an organization (e.g., bank, banking institution, credit card company, lender, financial institution), and the attacker persuades the victim to perform operations on a computing device of the victim (e.g., a computer, a laptop, a smartphone, a tablet) in which the victim is directed by the attacker to log-in or to sign-in into the victim's online account and then the victim is directed by the attacker to perform online operations that yield a benefit to the attacker and/or that cause damage to the victim and/or that cause damage to a third party (e.g., the bank, the credit card issuer, or the like); particularly, for example, operations in which the attacker dictates to the victim instructions or guideline to perform funds transfer from the victim's own account to another account which is actually controlled by the attacker. In some embodiments, the terms "vishing" or "vishing attack" may comprise other types of attacks in which the victim is contacted by a criminal or a fraudster or an attacker that guides or directs or commands the victim to perform certain operations, and/or in which the victim is performing certain operations online under duress or under the dictated commands of an attacker. In some embodiments, the terms "vishing" or "vishing attack" may comprise an attack in which a non-human caller, such as a robot-caller or robo-caller or a computerized machine or automated machine or other "bot" interacts via a telephone call with the victim and/or guides the victim which operations to perform online; as well as an attach performed by a combination of a human attacker and a non-human attack module (e.g., the human attacker calls the victim and narrates an introductory explanation, and then directs the victim to follow the guidelines that an automated machine or message provides over the phone).

Some embodiments of the present invention may detect a vishing attack in real time, or near real time, or substantially simultaneously or concurrently as the vishing attack (or at least a portion thereof) is carried out; for example, by monitoring online operations of the victim in real time or near real time (e.g., several seconds after each operations is performed) and analyzing them (e.g., as described herein) to deduce or to estimate or to determine that a vishing attack is being performed; and to immediately send a notification or indication of such real-time vishing attack to a suitable recipient (e.g., cyber security team or fraud department of the bank). Some embodiments may detect a vishing attack in retrospect, after it occurred, and/or after it was completed, and/or after it was attempted; for example, by inspecting and analyzing logged transactions and/or logged user interactions that were already performed, and by deducing from them that a certain transaction and/or that a certain set of operations were performed by the victim within a vishing attack. Some embodiments may provide autonomous real-time vishing attack detection and protection (e.g., stopping or rejecting an attempted transaction in real time), and/or autonomous retrospective or after-the-fact detection and mitigation (e.g., cancelling or reversing an already-submitted transaction or even an already-performed transaction).

A first set of embodiments of the present invention operates to automatically detect a vishing attack based on Playbook Detection. The Applicants have realized that when a fraudster guides or instructs the victim what to do, the fraudster often follows a pre-defined, fraudulent, "playbook" or step-by-step set of instructions that the fraudster is dictating to the victim over the phone, detailing which online operations to do exactly, and in which order or sequence, and often further dictating to the victim which buttons to click, which fields to fill out, which fields to leave blank, which User Interface (UI) or GUI elements to utilize or to engage (e.g., to operate a drop-down menu, to scroll down or up or sideways), or the like. In accordance with the present invention, a "vishing" playbook may be pre-defined or profiled by the computerized system of the present invention by taking into account multiple parameters, for example: list of actions taken, GUI elements that were selected and/or clicked and/or otherwise engaged, list of input fields that were filled out, the sequence or order of such actions, the time that elapsed between such actions, or the like. Accordingly, the particular sequence or list of operations that a user performs in his online account in a usage session, is compared to or is analyzed in view of various Vishing Playbook Profiles, in order to find a sufficient match or similarity to at least one such Playbook; a similarity score, indicating how similar the user's operations are, relative to a particular Vishing Playbook Profile, may be generated by the system and utilized as a risk score or risk indicator; such that the greater the similarity between the operations that the user performed and the pre-defined playbook profile of a vishing attack, the more likely is it that the set of operations that the user performed were indeed performed due to a dictating fraudster and not in a voluntary free manner.

A second set of embodiments of the present invention operates to automatically detect a vishing attack, based on detecting that the user of an online service is operating the service under duress and/or under dictated instructions that are dictated to him. The Applicants have realized that a legitimate user that is not subject to a vishing attack, performs operations in an online service in a manner that is different from a vishing attack victim, who operates under the duress of dictated instructions and also has to hold a telephone and speak on the telephone in parallel to operating the online service; and that a user who is not a victim of a vishing attack is free to perform online operations without the need to speak on the phone at the same time and without the duress of being instructed what to do online. Accordingly, the present invention may detect a vishing attack based on the impact or the effect that such attack has, as reflected in user operations. For example, a rhythm of typing, and/or a rhythm of typographical errors, may be indicative that the user is being instructed what to type (and is thus a victim of a vishing attack); or conversely, may indicate that the user is more-probably operating freely and voluntarily without being dictated what to do or what to type. Additionally or alternatively, for example, a user that is not subject to a vishing attack exhibits focused and concise online operations, that do not waste his time and/or that reflect his intention to achieve a desired goal efficiently and without distraction; whereas in converse, a user that is a victim of a vishing attack may often spend time waiting and listening to instructions that are dictated to him over the phone and during that "waiting time" may often move the on-screen pointer (e.g., mouse pointer, touchpad pointer) aimlessly or in accordance with a pattern (e.g., moving the mouse-pointer back-and-forth or left-and-right or in circular movements) or performing "doodle" movements or un-purposefulness movements of the on-screen pointer while he waits or while he listens to the attacker's instructions. Monitoring and analyzing the user interactions may thus reveal whether it is more likely that the user acted under duress (e.g., within a vishing attack), or whether it is more likely that the user acted without duress and according to his own free will. The user interactions, that were performed within a certain user transaction or usage session (e.g., a wire transfer session), may thus be analyzed and/or compared to such criteria, in order to generate a risk score or a probability score that indicates how close the logged interactions are to a behavioral profile of a victim that operates under duress or to a victim that operates in a vishing attack unknown to himself.

A third set of embodiments of the present invention operates to automatically detect a vishing attack, based on detecting or estimating that the user of an online service is operating the service while the user is also speaking on the telephone, and/or while the user has an on-the-phone posture or position, and/or while the user is holding a telephone to his ear concurrently to performing online operations. The Applicants have realized that a victim of a vishing attack, who needs to hold and operate a telephone (e.g., to receive the telephonic instructions of the attacker) in parallel to operating a computer (or computing device) to perform such instructions, exhibits behavioral characteristics that are different from those of a non-victim user who is not subject to a vishing attack. The fact that the user holds a telephone and also listens and talks through the telephone, while the user also operates the computer or the computing device, impacts or affects the posture and/or the user's behavior and/or the user's interactions with the computer (or computing device, or the "app" or website). Experiments performed by the Applicants have shown that a user that performs operations in an online service without holding and utilizing the phone, and the same user that performs operations in the same online service while also holding and utilizing the phone, exhibit different behavioral characteristics with regard to, for example, typing speed, typing rhythm, typographical errors frequency, typographical errors rhythm, mouse movement (or other on-screen pointer movement), and/or other characteristics that may be sensed by a sensor and/or accelerometer and/or gyroscope and/or compass and/or device orientation sensor of the user's device. The user interactions, that were performed within a certain user transaction or usage session (e.g., a wire transfer session), may thus be analyzed and/or compared based on such criteria, in order to generate a risk score or a probability score that indicates how close the logged interactions are to a behavioral profile of a victim that performs these interactions in parallel to also holding a telephone and/or speaking on the phone and/or listening on the phone.

Figure 1:
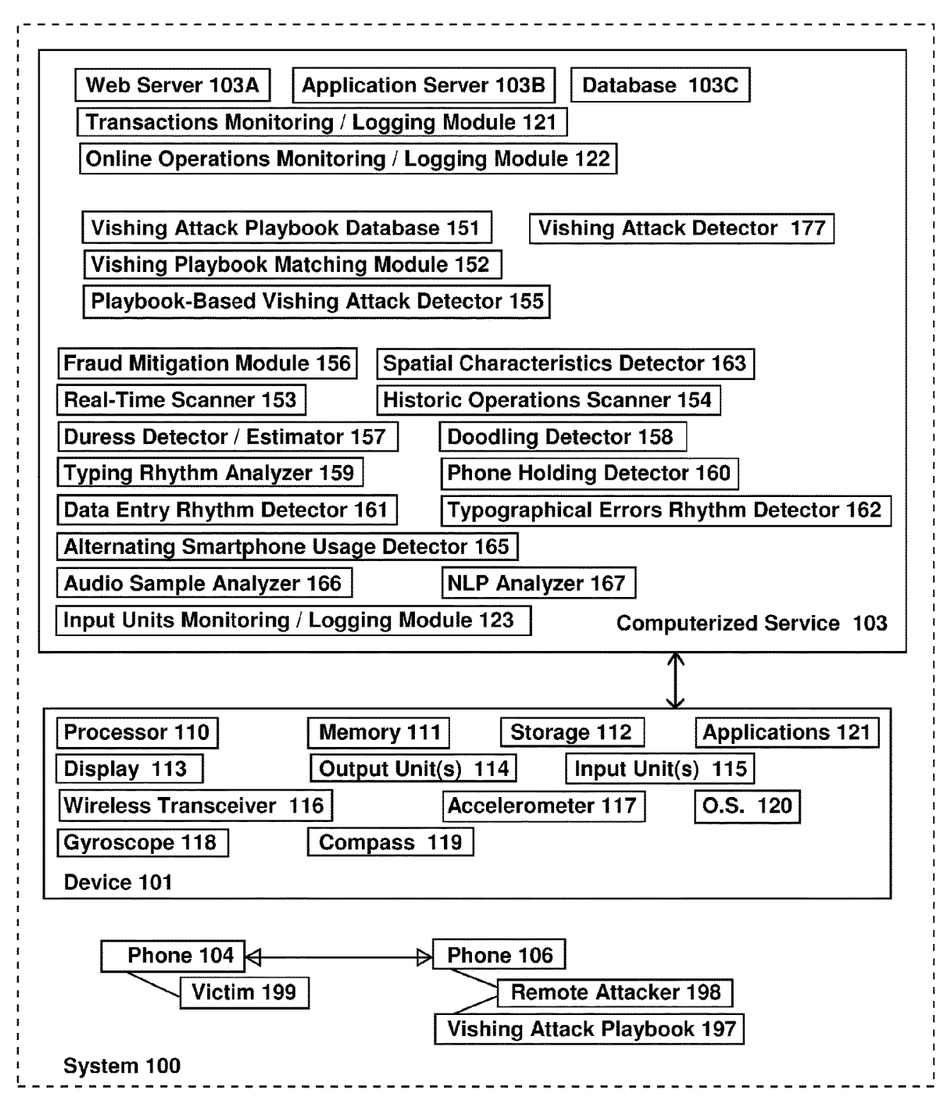
FIG. 1 is a schematic block-diagram illustration of a system, in accordance with some demonstrative embodiments of the present invention.

Reference is made to FIG. 1, which is a schematic block-diagram illustration of a system 100, in accordance with some demonstrative embodiments of the present invention. For example, a device 101 (e.g., laptop computer, desktop computer, tablet, smartphone) is utilized by a victim user 199 in order to access and to perform online operations in a computerized service 103 (e.g., a banking website, an online banking system, or the like), for example over the Internet or over wireless communication link(s) and/or wired communication link(s). The victim user 199 is also holding or utilizing, concurrently, a phone 104, through which he receives instructions or commands that are dictated to him by a remote attacker 198 who utilizes his own phone 106 to convey such instructions to the victim user 199.

For example, device 101 may comprise: a processor 110 to execute code; a memory unit 111 to store data (e.g., Flash memory); a storage unit 112 to store data long-term (e.g., Flash memory; hard disk drive; solid state drive); a display unit 113 (e.g., screen, monitor, touch-screen); other output unit(s) 114 (e.g., headphones, audio speakers); one or more input units 115 (such as, mouse, touch-screen, microphone); a wireless transceiver 116 (e.g., Wi-Fi transceiver, Bluetooth transceiver, cellular transceiver); optionally, one or more accelerometers 117, one or more gyroscopes 118 (or other device-orientation sensors), one or more compass units 119; an Operating System (OS) 120; one or more applications 121 or "apps" (e.g., a mobile application, a native application, a mobile-friendly application, a desktop application, a browser-based application); and/or other suitable hardware components and/or software components.

Computerized service 103 may comprise, or may be implemented by using, for example, a web server 103A, an application server 103B, a database 103C, and/or other suitable components. For example, computerized service 103 may be an online banking service, which may comprise or may utilize a web server to serve pages of the website of the banking entity to its customers, and/or an application server to run server-side applications and/or to perform server-side operations (e.g., to perform the banking operations that carry out a "funds transfer" command), and/or a database that stores banking records of customers, or the like.

The system 100 monitors and logs the interactions of the victim user 199 with the computerized service 103, and particularly monitors and logs: (i) the transactions performed by the victim user 199 (e.g., wire transfer; balance inquiry), and (ii) the online operations performed by the victim user 199 and his engagement with UI elements or GUI elements (e.g., the victim user 199 clicks on a "confirm" on-screen button; the victim user 199 engages with a drop-down menu GUI element to select a bank account), and (iii) the actual interactions that the victim user 199 performs via one or more of the input units.

For example, a Transactions Monitoring/Logging Module 121 monitors and logs which transactions are performed or commanded or submitted or initiated by the victim user; for example, logging that at time point T3 the victim user submitted a "wire funds" transaction. An Online Operations Monitoring/Logging Module 122 monitors and logs which operations were performed by the victim user; for example, that at time point T2 (e.g., five seconds before time point T1) the victim user engaged with the on-screen drop-down menu of selecting the source account for the funds to be transferred out. An Input Units Monitoring/Logging Module 123 monitor and logs that at time point T1 (e.g., three seconds before time point T2), the victim user performed a drag-and-drop operation of his computer mouse for one second in order to reach the drop-down menu and then the victim user left-clicked on that drop-down menu via his mouse and then he chose an item from the drop-down menu using the Arrow Keys on his keyboard and the Tab key on his keyboard.

It is noted that in some embodiments, modules 121 and/or 122 and/or 123 may be part of computerized service 103 (e.g., implemented as server-side units), and/or may be part of device 101 (e.g., implemented as client-side units), and/or may be a combination of modules which may be implemented as server-side module(s) and/or client-side module(s). For example, in some embodiments, the Transactions monitoring and logging may be performed at the server-side of computerized service 103, which receives the submitted commands to perform transactions and is supposed to execute them; and/or the transactions monitoring and logging may be performed at the client side in the device 100 which sends out the commands to perform such transactions. For example, the monitoring of Input Units interactions may be implemented as a client-side module, e.g., as part of the application or "app" (e.g., a banking application, or banking website) which locally monitors and logs all keystrokes and mouse-gestures and touchpad gestures; and/or may be implemented as client-side browser extension or plug-in or add-on, or as JavaScript/HTML5/CSS code portions. In some embodiments, the engagement of the user with various UI or GUI elements, may be monitored and logged in a client-side manner (e.g., logged locally upon a local click of the user on a GUI element) and/or in a server-side manner (e.g., logged at the server of the computerized service 103 which receives a signal that indicates that a certain GUI element was clicked, or was engaged). In some embodiments, data that was monitored and/or logged locally in (or at, or by) device 101, may be sent and/or uploaded from device 101 to the server of computerized service 103, or to a security module associated therewith, for further processing and/or server-side analysis. In some embodiments, data that was monitored and/or logged in (or at, or by) the computerized service 103 and/or its server, may be sent and/or transmitted from it to the device 101 for further local (client-side) analysis, and/or may be sent for another security module associated therewith.

The attacker 198 that dictates instructions to the victim user 199 over the phone, may follow a pre-defined Vishing Attack Playbook 197 that the attacker had prepared in advance and that he follows step-by-step. The Vishing Attack Playbook 197 comprises step-by-step instructions that are then converted at the victim's side to step-by-step operations, such as: (I) log-in to your (the victim's) account at MyBank.com; (II) click on "balance inquiry" on the left side; (III) click on "transfer funds" on the right side; (IV) select "immediate transfer" from the drop-down menu that contains the options of "immediate transfer" and "future transfer"; and so forth.

The system may comprise a Vishing Attack Playbook Database 151, which may store representations of one or more such Playbooks that are known or that are estimated, based on research performed by fraud prevention department or cyber security researchers. For example, based on retrospective analysis of several already-occurred vishing attacks at MyBank.com, the fraud department of that bank may observe a repeated pattern of monitored and logged Transactions and/or monitored and logged online operations and/or monitored and logged GUI engagement operations; and may be able to extract or to deduce a general Playbook that serves an attacker (or multiple attackers) that command that type of vishing attacks.

It is noted that the Vishing Attack Playbook 197 that is utilized by the attacker, may be for example a textual narrative of step-by-step instructions; whereas, each record in the Vishing Attack Playbook Database 151 may store digital representations of such instructions (or, of the online operations that are derived from them). For example, the Vishing Attack Playbook 197 that is utilized by the attacker may comprise a textual item of "Please click on Balance Inquiry on the left side"; whereas, a corresponding entry in the Playbook that is stored in the Vishing Attack Playbook Database 151 may represent "User (victim) clicked on (or otherwise selected) the Balance Inquiry hyperlink in the Account Summary web-page".

A Vishing Playbook Matching Module 152 operates to search for, and to find, a match or a similarity between: (I) a transaction performed by the victim user and/or the online operations that yielded that transaction and/or the GUI engagement operations of those online operations; and (II) a representation of a Vishing Attack Playbook out of one or more such Playbooks that are stored in the Vishing Attack Playbook Database 151.

If the Vishing Playbook Matching Module 152 finds a match (e.g., an exact match), or a sufficiently-similar match (e.g., at least N percent of the victim's operations in this transactions have followed the operations in the Vishing Attack Playbook that is stored in database 151; wherein N may be 80 or 90 or other suitable threshold value), then a Playbook-Based Vishing Attack Detector 155 generates an indication or a message that a playbook-based detection of vishing has occurred; and a Fraud Mitigation Module 156 may perform one or more pre-defined mitigation operations (e.g., put a Hold on the associated transaction; add a Fraud Flag to the associated transaction; send a message to the fraud department; send a message to the victim user; lock the account until the victim authenticates to a customer service representative; or the like).

For demonstrative purposes, the Vishing Attack Playbook Database 151, the Vishing Playbook Matching Module 152, and the Playbook-Based Vishing Attack Detector 155 are depicted as server-side units of computerized service 103; however, one or some or all of them may be implemented as client-side modules in device 101; or they may be implemented as a combination of server-side and client-side modules.

One or more of the operations that are described above or herein, may be performed or implemented by a Vishing Attack Detector 177; which may be implemented as a server-side unit or module, or as a client-side (end-user device side) unit or module, or as a combination of server-side and client-side modules or units. For demonstrative purposes, Vishing Attack Detector 177 is depicted as a separate module; however, it may be implemented as a unit or module that comprises multiple other units or modules that are depicted, and/or may be implemented as part of (or in combination with) other module(s) or unit(s) depicted. For example, the playbook-based vishing attack detector 155, may be implemented as part of a more-general Vishing Attack Detector 177 able to detect vishing attack(s) based on playbook identification and/or based on other methods as described above and herein.

In some embodiments, computerized service 103 may comprise a real-time scanner 153 and/or a historic operations scanner 154, which may be configured to operate in conjunction with (or as part of; or as associated with) the Playbook-Based Vishing Attack Detector 155. For example, historic operations scanner 154 may scan and analyze a batch or a set of past transaction(s) and/or operation(s) of a particular user, or of a group of users, in order to identify that a set of such transactions and/or operations matches (e.g., sufficiently, beyond a pre-defined threshold value of similarity) at least one pre-defined Vishing Attack Playbook that had been profiled and defined in the Vishing Attack Playbook Database 152; and the historic operations scanner 154 may automatically detect and notify the administrator of computerized service 103 about such possibly-fraudulent past transactions that appear to be vishing related. The real-time scanner 153 may operate in real time or in near real time, to analyze a newly-submitted transaction (e.g., a newly-submitted transaction of "wire funds") and to detect whether it matches a previously-defined Vishing Attack Playbook; and/or may analyze in real time a newly-performed UI or GUI engagement operation or an online operation, to check whether it fits into one or more of the Vishing Attack Playbooks that are stored in database 151, and to autonomously generate real-time or near-real-time alerts or possible-fraud notifications about such transactions and/or operations immediately as they occur or immediately as they are submitted for server-side fulfillment (e.g., and prior to actual server-side fulfillment of such requested transactions).

In some embodiments, a Duress Detector/Estimator 157 may operate to detect, or to estimate, that a particular transaction or that a set of operations were more-probably or most-probably performed by the user under duress, or under illegitimate influence or fraudulent influence of a third party, or while the user was obeying or following dictated instructions that were dictated to him by a third party.

For example, analysis of the user interactions that are associated with a submitted transactions, by a Doodling Detector 158, may indicate that a user performed "doodling" operations (e.g., repetitive movement of the on-screen pointer, typically according to a particular pattern or a shape, or back and forth, or in circular motion, or in polygon shape) during one or more time-periods of inactivity within a set of operations that yielded that transactions; and such detection of a doodling period or doodling time-slot or doodling activity, particularly within an important banking transactions such as a wire transfer, may trigger an estimation or determination that the user was operating under duress or under dictated instructions of a vishing attacker. Optionally, the detection of doodling activity may be indicative of a vishing attack, only if all or most or some of the prior transactions of that particular user, of the same type of transactions (e.g., prior wire transfers by that user), did not exhibit doodling activity at all; or exhibited doodling activity that is smaller than the current doodling activity by at least N percent of by other threshold value (e.g., the currently-analyzed doodling activity spanned 27 seconds during the transaction submission process, whereas prior transactions exhibited doodling activity for only 2 or 3 seconds per transaction submission process).

Additionally or alternatively, a Typing Rhythm Analyzer 159 may analyze the user interactions and may characterize their rhythm; such as, not only the typing speed (e.g., characters per second), but rather, the internal patterns of typing and pausing; and such rhythm may be utilized to determine or to estimate that a vishing attack was performed. For example, a non-attacked user that types data into fields of a banking application or a banking website, to perform a wire transfer, may operate in a concise and focused manner that exhibits a generally fixed rhythm of entering data; such as, the non-attacked user enters the beneficiary name by rapid typing, then pauses for two seconds and enters the beneficiary address by rapid typing, then pauses for five seconds and enters the beneficiary account number, and so forth. In contrast, a victim of a vishing attack exhibits a different, unique, pattern or rhythm of typing and pausing; for example, starting the "wire transfer" data entry by a pause of non-activity (e.g., no data is typed or entered) while the vishing victim listens to the attacker for 15 seconds; then, typing in a first field at a relatively slower speed or pace (e.g., slower than previously-recorded pace or speed of that user), and in a manner or rhythm that indicates hesitation (e.g., typographical error(s) in simple fields that are supposed to be familiar to the user; slow typing of data that is supposed to be familiar to the user); then, another long pause of 12 seconds as the vishing victim listens to further instructions of the attacker then, slow entry and/or hesitant entry and/or error-infested entry of data into the next field; and so forth. The Typing Rhythm Analyzer 159 may thus autonomously detect or estimate, that an observed rhythm of typing or of typographical errors, is more similar to rhythms that are pre-defined as rhythms that are typically sensed in a vishing attack, relative to rhythms that characterize data entry by a non-attacked user.

Additionally or alternatively, system 100 may comprise or may utilize a unit or module which operates to detect or determine that the user of device 101 is operating the device 101 while also holding a phone; as this may be indicative of, or may base a determination of, a vishing attack being carried out against such user. For example, a Phone Holding Detector 160 may be part of device 101 and/or of computerized service 103, and may reach such determination based on one or more of the following sensed parameters, or by taking into account one or more some or all of the following parameters: (1) detecting that the typing rhythm of the user on device 101, is similar (by at least a pre-defined threshold value of similarity) to a pre-defined typing rhythm that characterizes users that hold a phone to their ear while also operating a non-phone computing device such as device 101; for example, exhibiting pauses and non-typing periods and no-data-entry periods in which the user is listening to the phone, and/or exhibiting a pattern that indicates that the user is typing or entering data (or engaging with UI or GUI elements) only with one hand (e.g., since his other hand is holding the phone to his ear); (2) detecting that the typing rhythm of the user on device 101, is different (by at least a pre-defined threshold value of difference) from previous or past or historic or most-recent rhythm or rhythms that were monitored in the past for this particular user (e.g., in general, or in this particular type of transactions, such as in previous "fund transfer" transactions data entry); for example, in previous data entry session(s) of the same user in the same type of transactions, the user had a generally-fixed rhythm of typing or data entry and did not exhibit long (e.g., longer than N seconds, or other threshold value) periods of inactivity; whereas in the current or in the investigated usage session, the user exhibits one or more periods of inactivity or a "broken" or "interrupted" data entry process due to partial inability to type with two hands or due to the ability to type or to engage with UI or GUI elements with only one hand, or due to having a particular bodily posture (e.g., holding the phone to his ear via a raised shoulder) that causes the user to exhibit a different typing rhythm or data entry rhythm compared to previously-observed or historic or past data-entry rhythm of that user in this type of transactions; (3) similarly to parameter (1) above, detecting a current rhythm of introducing typographical errors, which is sufficiently similar to a pre-defined rhythm of introducing typographical errors that characterizes users that hold a phone to their ear; (4) similarly to parameter (2) above, detecting a current rhythm of introducing typographical errors, which is sufficiently different than (e.g., sufficiently greater than or more frequent than or more erroneous than) historic or past or previous or most-recent rhythm of introducing typographical errors of that same user in this type of transactions; (5) determining that a pattern or a characterizing feature of multiple on-screen pointer movements, that are a result of mouse gestures or touch-pad gestures or other input-unit gestures, is sufficiently similar to a pattern or to a characterizing feature that is pre-defined as such that characterizes a user that operates a non-phone device 101 while also holding a phone to his ear; (6) determining that a pattern or a characterizing feature of multiple on-screen pointer movements, that are a result of mouse gestures or touch-pad gestures or other input-unit gestures, is sufficiently different from previous or historic or past or most-recent pattern(s) or characterizing feature(s) of the same user in similar past transactions that he performed; (7) utilizing one or more data that is sensed or measured by accelerometer(s) and/or gyroscope(s) and/or compass unit(s) and/or device-orientation sensor(s) of device 101, to determine that the user is tilting or rotating or moving the device 101 (e.g., which may be a tablet that the user holds in two hands, while the user also holds a phone to his ear via his raised shoulder) in a manner or in a pattern or with behavioral characteristic or with spatial characteristics (e.g., device 101 orientation and changes therein; device spatial location and changes therein; device acceleration or deceleration and changes therein) that are sufficiently similar (e.g., beyond a pre-defined level of similarity) to a manner or a pattern or to a behavioral characteristic or to spatial characteristics that characterize a device that is being operated by a user while such user is also holding a phone to his ear; (8) similarly to parameter (7) above, determining that such sensed or measured data, is sufficiently different from the previously-observed or previously-sensed data that was sensed by the same type of sensors in one or more past or previous or most recent usage sessions of the same user, optionally when he performed the same type of transaction on the same website or application. The above-mentioned conditions, criteria and/or parameters (or a selected subset of them) may be utilized in combination, and may be implemented, measured, detected, compared and/or analyzed via one or more suitable units or modules, for example, performed by a Data Entry Rhythm Detector 161, by a Typographical Errors Rhythm Detector 162, by a Spatial Characteristics Detector 163, and/or by other suitable units or modules.

In some embodiments, optionally, system 100 may comprise or may utilize a unit or module, such as an Alternating Smartphone Usage Detector 165, to detect or to estimate that a particular scenario is taking place or took place, in which the user is alternately utilizing one smartphone for both (I) receiving audio instructions from a third-party vishing attacker, and (II) accessing the computerized service (e.g., banking application, banking website) to perform such audio instructions via the touch-screen of that same smartphone. For example, the Alternating Smartphone Usage Detector 165 may utilize data sensed by the accelerometer(s) and/or gyroscope(s) and/or compass unit(s) and/or device-orientation sensor(s) of device 101, to detect an alternating pattern of spatial locations or characteristics; such as, detecting that the smartphone was put to the ear (e.g., a generally vertical orientation of the smartphone) for ten seconds (the user listens to audio instructions and is not engaging with the touch-screen of the smartphone), then detecting that the smartphone is generally horizontal and that the touch-screen of the smartphone is being engaged by the user (e.g., the user is not listening to audio instructions, and is entering data on the same smartphone), then repeating such alternate pattern of (I) smartphone being utilized for hearing audio instructions and/or for talking and/or being generally vertical in its orientation, and (II) smartphone is not being utilized for hearing audio instructions and/or is not being utilized for talking and/or is being in generally-horizontal orientation and/or is being utilized to enter data or to engage with UI or GUI elements via its touch-screen, and then repeating such alternating usage pattern, which is indicative of a vishing attack taking place in the background.

In some embodiments, optionally, system 100 capture audio sample(s) via a microphone of device 101, and may analyze them locally in device 101 and/or remotely in a remote server of computerized service, to perform speech-to-text conversion of such captured audio; and to detect one or more pre-defined keywords or natural language word(s) or term(s) that match a pre-defined list of keywords or terms that indicate that a third party is dictating to the user to perform online operations. For example, a local or remote Audio Sample Analyzer 166 may perform such speech-to-text conversion to extract words or phrases or terms from captured audio samples, and a Natural Language Processing (NLP) Analyzer 167 may analyze the extracted text or words or phrases or terms, optionally in relation to a pre-defined Lookup Table 168 or list or database of words or terms that characterize (or that are typically found in) a vishing attack; for example, detecting audio samples which comprise instructions such as "please click on the Beneficiary field on the left side" or such as "now, please select Wire Funds Now on the top-right corner of your screen", and deducing that the operations are most-probably or more-probably associated with a vishing attack that is performed on the user of device 101 without his knowledge.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

The present invention may enable machines and/or computerized systems to have new capabilities and/or new functions that were not available to such machines or systems so far; including, for example: a new capability to correctly differentiate among multiple human users; a new capability for machines or computerized systems to differentiate between (I) a legitimate or "naïve" user, and (II) a fraudster or a human user having criminal intent or an illegitimate user; a new capability for machines or computerized systems allowing the machine or the computerized system to defend itself or to protect itself against cyber-attacks and/or illegitimate operations, and/or against impostors or identity-thieves or dishonest users; a new capability for machines or computerized systems to correctly identify and/or detect that a current user of an online resource or an online destination, is not the same human user that had accessed the same resource previously, even if the two access sessions were performed via the same device and/or via the same browser or application and/or from the same IP address and/or when the user/s are already logged-in and/or are already authenticated; a new capability for machines or computerized systems to defend or protect themselves against fraudulent transactions or criminal behavior or against hackers, crackers, human hackers, automated hacking tools, "bot" or other automated scripts; a new capability for machines or computerized systems to initiate and to perform fraud-mitigation operations based on analysis of user interactions; improved security and/or integrity and/or reliability of machines and computerized systems; and/or other new capabilities that conventional machines and conventional computerized systems do not have and that the present invention provides.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

In some embodiments, a method comprises: (a) monitoring user interactions of a user that utilizes an electronic device to interact with a computerized service; (b) analyzing said user interactions, and determining that a set of operations were performed by said user as part of a vishing attack in which an attacker dictated to said user which operations to perform in said computerized service.

In some embodiments, the analyzing of step (b) comprises: determining that said set of operations were performed as part of a vishing attack, based on a detected match between: (I) said set of operations, and (II) a pre-defined playbook of operations that are dictated by attackers in vishing attacks.

In some embodiments, the analyzing of step (b) comprises: (i) comparing between (I) said set of operations performed by the user, and (II) a pre-defined vishing attack playbook that is utilized by vishing attackers; (ii) determining that said set of operations is sufficiently similar, beyond a pre-defined threshold value of similarity, to said pre-defined vishing attack playbook; (iii) based on the determining of step (ii), determining that said set of operations were performed by said user as part of a vishing attack.

In some embodiments, the method comprises: (i) storing in a vishing attack playbook database, two or more playbooks of vishing attacks; (ii) comparing between (I) said set of operations performed by the user, and (II) each one of said two or more playbooks of vishing attacks; (iii) determining that said set of operations is sufficiently similar, beyond a pre-defined threshold value of similarity, to a particular playbook; (iv) based on the determining of step (iii), determining that said set of operations were performed by said user as part of a vishing attack.

In some embodiments, the monitoring of step (a) comprises: monitoring user interactions of a customer of a financial service provider, wherein said user utilizes said electronic device to interact with a website or an application of said financial service provider; wherein step (b) comprises: (A) scanning historic transactions that were submitted online to said financial service provider; (B) detecting a match between (I) a set of online operations that were performed as part of a particular historic transaction, and (II) a pre-defined playbook of vishing attack; (C) based on the match detected in step (B), determining that said historic transaction was more-probably performed by a victim of a vishing attack that received dictated telephonic instructions.

In some embodiments, the monitoring of step (a) comprises: determining a particular typing rhythm that characterizes said set of operations performed by said user; wherein step (b) comprises: comparing between (I) the particular typing rhythm that characterizes said set of operations performed by said user, and (II) one or more typing rhythms that characterize data entry by vishing attack victims that perform dictated instructions; and based on said comparing, determining that said set of operations were performed by said user as part of a vishing attack.

In some embodiments, the method comprises: storing in a database two or more representations of typing rhythms that characterize data entry by victims of vishing attacks; wherein the monitoring of step (a) comprises: determining a particular typing rhythm that characterizes said set of operations performed by said user; wherein step (b) comprises: detecting a match between (I) the particular typing rhythm that characterizes said set of operations performed by said user, and (II) at least one typing rhythm that characterizes victims of vishing attacks as stored in said database.

In some embodiments, step (b) comprises: (A) detecting that said user interactions, during a process of entering a financial transaction, include a doodling activity; (B) based on the detecting of step (A), determining that said financial transaction was entered by a victim of a vishing attack.

In some embodiments, step (b) comprises: (A) detecting that said user interactions, during a process of entering a financial transaction, include a doodling activity that is longer than a pre-defined threshold value of N seconds, wherein N is a positive number; (B) based on the detecting of step (A), determining that said financial transaction was entered by a victim of a vishing attack.

In some embodiments, step (b) comprises: (A) detecting that said user interactions, during a process of entering a financial transaction, include a doodling activity; and further detecting that previous usage sessions by said user did not include doodling activity; (B) based on step (A), determining that said financial transaction was entered by a victim of a vishing attack.

In some embodiments, step (b) comprises: (A) detecting that said user interactions, during a process of entering a financial transaction, include a doodling activity that is longer than a pre-defined threshold value of N seconds, wherein N is a positive number; and further determining that previous usage sessions of said user included doodling activity that is shorter than a pre-defined value of M seconds, wherein M is a positive number and wherein M is smaller than N; and (B) based on step (A), determining that said financial transaction was entered by a victim of a vishing attack.

In some embodiments, said electronic device is a smartphone; wherein step (b) comprises: (A) sensing device orientation data of said smartphone, via at least one of: an accelerometer of said smartphone, a gyroscope of said smartphone, a compass unit of said smartphone, a device-orientation sensor of said smartphone; (B) detecting an alternating usage pattern of said smartphone, in which the smartphone is alternating between: (B1) being utilized for hearing telephonic audio while not being engaged via its touch-screen, and (B2) being engaged via its touch-screen; (C) based on the alternating usage pattern detected in step (B), determining that said smartphone was utilized to access said computerized service within a vishing attack against said user.

In some embodiments, step (b) comprises: (A) detecting that said user interactions, during a process of entering a financial transaction, exhibit a behavioral pattern that matches a pre-defined behavioral pattern that characterizes users that both (A1) operate an electronic device to access the computerized service and also (A2) concurrently hold a phone to their ear; (B) based on step (A), determining that said financial transaction was entered by a victim of a vishing attack.

In some embodiments, step (b) comprises: (A) detecting that said user interactions, during a process of entering a financial transaction, exhibit a data entry rhythm that matches a pre-defined data entry rhythm that characterizes users that both (A1) operate an electronic device to access the computerized service and also (A2) concurrently hold a phone to their ear; (B) based on step (A), determining that said financial transaction was entered by a victim of a vishing attack.

In some embodiments, step (b) comprises: (A) detecting that said user interactions, during a process of entering a financial transaction, exhibit a typographical errors introduction rhythm that matches a pre-defined typographical errors introduction rhythm that characterizes users that both (A1) operate an electronic device to access the computerized service and also (A2) concurrently hold a phone to their ear; (B) based on step (A), determining that said financial transaction was entered by a victim of a vishing attack.

In some embodiments, step (b) comprises: (A) detecting that said user interactions, during a process of entering a financial transaction, exhibit a behavioral pattern that indicates that said user is utilizing only one hand to enter data and to engage with GUI elements of said computerized service; (B) based on an analysis that takes into account at least the detecting result of step (A), determining that said financial transaction was entered by a victim of a vishing attack.

In some embodiments, said electronic device is a non-smartphone device; wherein step (b) comprises: (A) sensing device orientation data and device spatial data of said electronic device, via at least one of: an accelerometer of said electronic device, a gyroscope of said electronic device, a compass unit of said electronic device, a device-orientation sensor of said electronic device; (B) detecting that said user interactions, during a process of entering a financial transaction, exhibit a pattern of device orientation data and of device spatial data that is sufficiently similar to a pre-defined pattern that characterizes computing devices that are operated by victims of vishing attacks while also holding a phone to their ear; (C) based on step (B), determining that said financial transaction was entered by a victim of a vishing attack.

In some embodiments, said electronic device is a non-smartphone device; wherein step (b) comprises: (A) detecting an alternating usage pattern of said electronic device by said user, which alternates between: (A1) a period of no data entry through the electronic device, and (A2) a period of data entry through the electronic device; (B) determining that said alternating usage pattern matches a pre-defined usage pattern of electronic devices that are utilized in a vishing attack; (C) based on step (B), determining that said financial transaction was entered by a victim of a vishing attack.

Some embodiments comprise a non-transitory storage article or storage medium having stored thereon instruction that, when executed by a machine, cause the machine to perform a method as described above or herein.

In some embodiments, a system comprises a vishing attack detector, configured (a) to monitor user interactions of a user that utilizes an electronic device to interact with a computerized service, and (b) to analyze said user interactions, and to determine that a set of operations were performed by said user as part of a vishing attack in which an attacker dictated to said user which operations to perform in said computerized service.

The present invention comprises devices, systems, and methods of detecting a vishing attack, in which an attacker provides to a victim step-by-step over-the-phone instructions that command the victim to log-in to his bank account and to perform a dictated banking transaction. For example, the system monitors transactions, online operations, user interactions, gestures performed via input units, and user engagement with User Interface elements. The system detects that the operations performed by the victim, follow a pre-defined playbook of a vishing attack. The system detects that the victim operates under duress or under dictated instructions, as exhibited in irregular doodling activity, data entry rhythm, typographical error introduction rhythm, unique posture of the user, alternating pattern of listening to phone instructions and performing online operations via a computer, and device orientation changes or spatial changes that characterize a device being used to perform an online transaction while also talking on the phone.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
(a) monitoring user interactions, that are performed via a touch-screen by a user that utilizes a smartphone to interact with a computerized service;
(b) analyzing said user interactions, that are performed via said smartphone, and determining from said user interactions that a set of operations were performed by said user as part of a vishing attack against said user in which an attacker dictated to said user which operations to perform on said smartphone towards said computerized service, and triggering a fraud mitigation module to perform one or more pre-defined fraud mitigation operations;
wherein step (b) comprises:
(A) sensing device orientation data of said smartphone, via at least one of: an accelerometer of said smartphone, a gyroscope of said smartphone, a compass unit of said smartphone, a device-orientation sensor of said smartphone;
(B) detecting an alternating usage of said smartphone, in which the smartphone is alternating between: (B1) the smartphone being utilized for hearing telephonic audio while not being engaged via the touch-screen of the smartphone, and (B2) the smartphone being engaged via the touch-screen of the smartphone;
(C) based on the alternating usage detected in step (B), determining that said smartphone was utilized to access said computerized service within a vishing attack against said user in which said attacker dictated telephonically to said user which operations to perform via the touch-screen of said smartphone which caused the user to alternate said smartphone between being utilized for listening to audio telephonic instructions and performing interactions on the touch-screen of the smartphone.

2. The method of claim 1, wherein the analyzing of step (b) comprises:
determining that said set of operations were performed as part of a vishing attack, based on a detected match between: (I) said set of operations, and (II) a pre-defined playbook of operations that are dictated by attackers in vishing attacks.

3. The method of claim 1,
wherein the analyzing of step (b) comprises:
(i) comparing between (I) said set of operations performed by the user, and (II) a pre-defined vishing attack playbook that is utilized by vishing attackers;
(ii) determining that said set of operations is sufficiently similar, beyond a pre-defined threshold value of similarity, to said pre-defined vishing attack playbook;
(iii) determining that said set of operations were performed by said user as part of a vishing attack, based on the determining of step (ii) and based on the alternating usage detected in step (B).

4. The method of claim 1, comprising:
(i) storing in a vishing attack playbook database, two or more playbooks of vishing attacks;
(ii) comparing between (I) said set of operations performed by the user, and (II) each one of said two or more playbooks of vishing attacks;
(iii) determining that said set of operations is sufficiently similar, beyond a pre-defined threshold value of similarity, to a particular playbook of vishing attacks;
(iv) determining that said set of operations were performed by said user as part of a vishing attack, based on the determining of step (iii) and based on the alternating usage detected in step (B).

5. The method of claim 1,
wherein the monitoring of step (a) comprises: monitoring user interactions of a customer of a financial service provider, wherein said user utilizes said electronic device to interact with a website or an application of said financial service provider;
wherein step (b) comprises:
(AA) scanning historic transactions that were submitted online to said financial service provider;
(BB) detecting a match between (I) a set of online operations that were performed as part of a particular historic transaction, and (II) a pre-defined playbook of vishing attack;
(CC) based on the match detected in step (BB), and further based on based on the alternating usage detected in step (B), determining that said historic transaction was performed by a victim of a vishing attack that received dictated telephonic instructions.

6. The method of claim 1,
wherein the monitoring of step (a) comprises: determining a particular typing rhythm that characterizes said set of operations performed by said user;
wherein step (b) comprises:
comparing between (I) the particular typing rhythm that characterizes said set of operations performed by said user, and (II) one or more typing rhythms that characterize data entry by vishing attack victims that perform dictated instructions; and based on said comparing and further based on the alternating usage detected in step (B), determining that said set of operations were performed by said user as part of a vishing attack.

7. The method of claim 1, further comprising:
storing in a database two or more representations of typing rhythms that characterize data entry by victims of vishing attacks;
wherein the monitoring of step (a) comprises: determining a particular typing rhythm that characterizes said set of operations performed by said user;
wherein step (b) comprises: detecting a match between (I) the particular typing rhythm that characterizes said set of operations performed by said user, and (II) at least one typing rhythm that characterizes victims of vishing attacks as stored in said database.

8. The method of claim 1, wherein step (b) comprises:
(A) detecting that said user interactions, during a process of entering a financial transaction, exhibit a behavioral pattern that matches a pre-defined behavioral pattern that characterizes users that both (A1) operate a smartphone to access the computerized service and to interact with the computerized service via its touch-screen, and also (A2) in an alternating manner, hold the smartphone to their ear;
(B) based on step (A), determining that said financial transaction was entered by a victim of a vishing attack who alternated the smartphone between (i) the smartphone being utilized to listen to telephonic audio instructions, and (ii) the smartphone being utilized to interact with the computerized service via the touch-screen of the smartphone.

9. The method of claim 1, wherein step (b) comprises:
(A) detecting that said user interactions, during a process of entering a financial transaction, exhibit a data entry rhythm that matches a pre-defined data entry rhythm that characterizes users that both (A1) operate a smartphone to access the computerized service and to interact with the computerized service via its touch-screen, and also (A2) in an alternating manner, hold the smartphone to their ear;

(B) based on step (A), determining that said financial transaction was entered by a victim of a vishing attack who alternated the smartphone between (i) the smartphone being utilized to listen to telephonic audio instructions, and (ii) the smartphone being utilized to interact with the computerized service via the touch-screen of the smartphone.

10. The method of claim 1,
wherein step (b) comprises:
(A) detecting that said user interactions, during a process of entering a financial transaction, exhibit a behavioral pattern that indicates that said user is utilizing only one hand to enter data and to engage with GUI elements of said computerized service;
(B) based on an analysis that takes into account at least the detecting result of step (A) and detection of an alternating usage of said smartphone in step (B), determining that said financial transaction was entered by a victim of a vishing attack.

11. A non-transitory storage article having stored thereon instruction that, when executed by a machine, cause the machine to perform a method which comprises:
(a) monitoring user interactions, that are performed via a touch-screen by a user that utilizes a smartphone to interact with a computerized service;
(b) analyzing said user interactions, that are performed via said smartphone, and determining from said user interactions that a set of operations were performed by said user as part of a vishing attack against said user in which an attacker dictated to said user which operations to perform on said smartphone towards said computerized service, and triggering a fraud mitigation module to perform one or more pre-defined fraud mitigation operations;
wherein step (b) comprises:
(A) sensing device orientation data of said smartphone, via at least one of: an accelerometer of said smartphone, a gyroscope of said smartphone, a compass unit of said smartphone, a device-orientation sensor of said smartphone;
(B) detecting an alternating usage of said smartphone, in which the smartphone is alternating between: (B1) the smartphone being utilized for hearing telephonic audio while not being engaged via the touch-screen of the smartphone, and (B2) the smartphone being engaged via the touch-screen of the smartphone;
(C) based on the alternating usage detected in step (B), determining that said smartphone was utilized to access said computerized service within a vishing attack against said user in which said attacker dictated telephonically to said user which operations to perform via the touch-screen of said smartphone which caused the user to alternate said smartphone between being utilized for listening to audio telephonic instructions and performing interactions on the touch-screen of the smartphone.

12. A system comprising:
a vishing attack detection and mitigation unit,
comprising a hardware processor able to execute code,
wherein the hardware processor is configured
(a) to monitor user interactions, that are performed via a touch-screen by a user that utilizes a smartphone to interact with a computerized service, and
(b) to analyze said user interactions that are performed via said smartphone, and to determine from said user interactions that a set of operations were performed by said user as part of a vishing attack against said user in which an attacker dictated to said user which operations to perform on said smartphone towards said computerized service, and
(c) to trigger one or more pre-defined fraud mitigation operations;
wherein the hardware processor is configured to perform:
(A) sensing device orientation data of said smartphone, via at least one of: an accelerometer of said smartphone, a gyroscope of said smartphone, a compass unit of said smartphone, a device-orientation sensor of said smartphone;
(B) detecting an alternating usage of said smartphone, in which the smartphone is alternating between: (B1) the smartphone being utilized for hearing telephonic audio while not being engaged via the touch-screen of the smartphone, and (B2) the smartphone being engaged via the touch-screen of the smartphone;
(C) based on the alternating usage detected in step (B), determining that said smartphone was utilized to access said computerized service within a vishing attack against said user in which said attacker dictated telephonically to said user which operations to perform via the touch-screen of said smartphone which caused the user to alternate said smartphone between being utilized for listening to audio telephonic instructions and performing interactions on the touch-screen of the smartphone.

* * * * *